Jan. 16, 1923.
J. F. JOHNSON.
BEARING.
FILED AUG. 8, 1921.
1,442,477
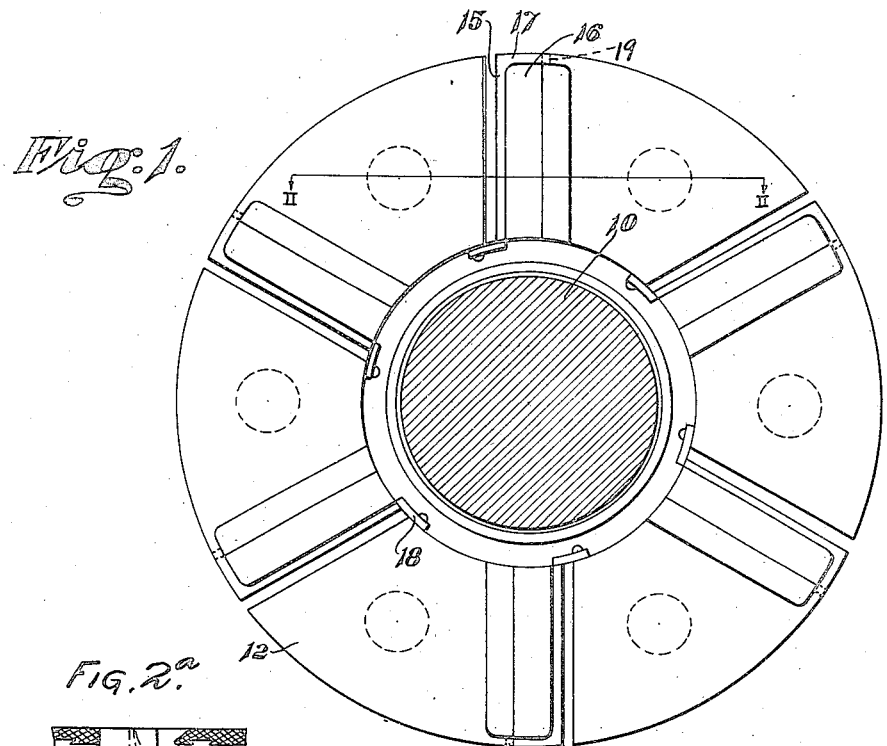
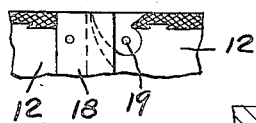
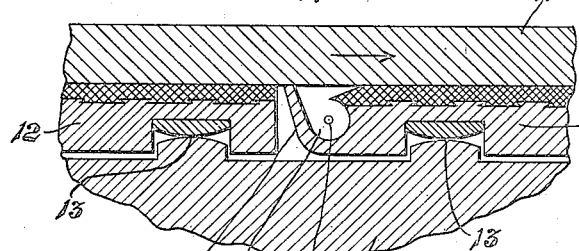
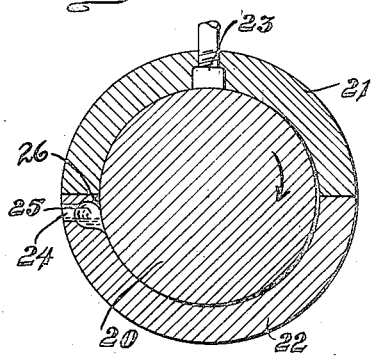
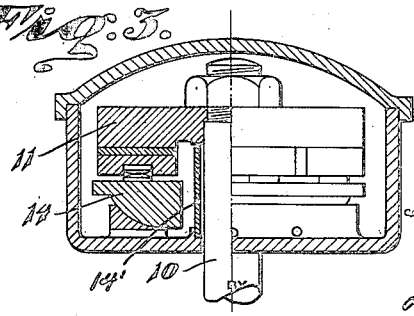
J. F. Johnson
INVENTOR
D. C. Davis
ATTORNEY Patented Jan. 16, 1923.

1,442,477

UNITED STATES PATENT OFFICE.

JOSIAH F. JOHNSON, OF SWARTHMORE, PENNSYLVANIA, ASSIGNOR TO WESTINGHOUSE ELECTRIC AND MANUFACTURING COMPANY, A CORPORATION OF PENNSYLVANIA.

BEARING.

Application filed August 8, 1921. Serial No. 490,750.

*To all whom it may concern:*

Be it known that I, JOSIAH F. JOHNSON, a citizen of the United States, and a resident of Swarthmore, in the county of Delaware and State of Pennsylvania, have invented a new and useful Improvement in Bearings, of which the following is a specification.

My invention relates to lubricated bearings and has for its object to provide a method and means for oiling bearings, which, in operation, tend to develop wedge-shaped or tapered oil films, whereby cool oil may be supplied for the formation of a film and the oil which has passed through successive portions of the film stage and has been heated due to friction is deflected so as to avoid contamination of the relatively cool oil being supplied for film formation.

Apparatus embodying features of my invention is illustrated in the accompanying drawings, forming a part of this application, in which—

Fig. 1 is a plan view showing the application of my invention to a thrust bearing of the tilting-shoe type;

Fig. 2 is a sectional view taken along the line II—II of Fig. 1 and also showing a section of a portion of the thrust collar;

Fig. 2ª is a fragmentary detail view showing the baffle structure for blocking the spaces between shoes.

Fig. 3 is a view, partially in elevation and partially in section, of an assembled bearing; and Fig. 4 is a view of an ordinary journaled bearing showing my improvement applied thereto.

In thrust bearings of the well-known Kingsbury or tilting shoe type, it is essential to provide sufficient oil which shall be cool enough to allow for the formation of proper load-sustaining, wedge-shaped oil films. A bearing of this type is usually immersed in a bath of oil, the oil being ordinarily maintained in circulation for cooling purposes. However, the lubrication schemes heretofore proposed do not provide for the supplying of fresh oil to the leading or inlet edge of each shoe, but a large portion of the oil which has constituted a preceding film and which has been heated on account of the high pressures and friction, enters with the fresh oil, thus raising the temperature of the entering oil and precluding the possibility of the formation of as good a film as might result if all of the entering oil should be fresh and relatively cool. It is, accordingly, the object of my invention to provide a thrust bearing of the character indicated with means which shall insure the deflection of oil which has passed through the film stage and the supplying of relatively cool, fresh oil to the leading or inlet side of each shoe.

My invention is also applicable to an ordinary journal bearing, it being only necessary to provide for the entry of oil at a suitable place for the formation of a tapering film and to provide for the deflection of the oil after it has passed through the thin-portion stage. In this way, as in the preceding example, oil which has passed through the film stage and been heated due to the bearing pressure and friction is positively deflected, thus preventing contamination to any appreciable extent of the entering fresh oil.

Referring now to the drawings for a more detailed description of my invention, I show a shaft 10, which, in operation, is submitted to a thrust load, provided with a thrust collar 11, which bears on a series of segmental shoes 12, tiltably mounted at 13 with respect to a self-alining or self-adjusting support 14. A sleeve 14' surrounds the shaft 10, so as to provide an oil supply space between the sleeve and the inner ends of the segmental shoes 12. These parts are of a well-known construction and will not be further described.

In the old type of construction, oil flows in the radial spaces between the shoes and cooperates with the thrust collar and with the tiltable shoes so that the latter may glide over the oil adhering to the thrust collar and tilt to form load-sustaining, wedge-shaped oil films. The oil is heated as it passes through the film stage and a portion of the heated oil mixes with the relatively cool oil supplied for the following shoe, resulting in raising the temperature of the latter oil and consequently heating the oil which is discharged from the leaving side of the following shoe to a still higher temperature, thereby resulting in the temperature of the inlet oil being at a higher point than the supply. Accordingly, I show baffle means 15 arranged between the shoes for the purpose of deflecting the oil passing from the leaving sides thereof. Preferably, the baffle or deflector constitutes the forward wall of an oil supply chamber 16 extending throughout the width of the leading side of a shoe, but for the thickness of a closure portion 17 at the outer end.

The segmental shoes 12 are provided with baffles 18 which block the radial spaces between the leaving sides of the shoes and the following deflectors or baffles, and serve the double purpose of compelling the cool oil to flow into the chambers 16 and of preventing the heated oil from passing in and contaminating the cool oil. The outer closing wall 17 of each chamber 16 is preferably provided with an outlet or discharge port 19, so as to permit only sufficient circulation to maintain a reasonably cool oil supply for the leading sides of the shoes without material reduction in oil pressure. The ports 19 assure that the chambers 16 shall be filled with fresh oil while the bearing is in operation, thereby preventing possible oil deficiency due to air pockets which might form should the ports not be provided.

Apparatus of the tilting shoe type, made in accordance with my invention and involving my new method, operates as follows: Circulation of oil is produced, as heretofore, between the leaving and leading sides of the shoes, but, in accordance with my invention, baffles are provided to compel the relatively cool oil to flow into the inner radial ends of the supply chambers 16 provided at the leading sides of the shoes, each shoe carrying a baffle member 15, preferably constituting one wall of the chamber 16 and serving to deflect heated oil passing from the leaving side of a preceding shoe, and a baffle 18 to block the spaces between the shoes. The ports 19 in the outer walls 17 of the chambers 16 serve to maintain just sufficient circulation in order to keep such chambers full of oil under the proper pressure to assure a sufficient supply to the front or leading edges of the shoes.

Referring to Fig. 4, a shaft 20 is shown mounted in a bearing comprising upper and lower portions 21 and 22, the shaft rotating in the direction of the arrow. The oil inlet 23 is provided at the top of the shaft and is so located as to be in the vicinity of the place where the tapered film starts to form. An oil outlet 24 is arranged at the left-hand side of Fig. 3 and communicates with a longitudinal chamber 25 provided with a baffle or deflector 26 extending throughout the major portion of the length of the bearing and constituting the upper wall of the chamber. The baffle cooperates with the shaft 20 to deflect the thin film of oil thereon into the channel 25 from which it flows to the outlet 24. The chamber 25 and the deflector or baffle 26 are so located as to secure removal of oil after it has passed through the tapered film stage and been heated up due to friction and pressure, thereby preventing contamination to any appreciable extent of the entering relatively cool oil.

The method employed in the structure of Fig. 1 is also involved in the structure of Fig. 4, namely, to supply relatively cool oil to a portion of a bearing where the formation of the film starts and to remove the oil after it has passed through stages of diminishing thickness in the film and absorbed heat.

From the foregoing, it will be seen that I have devised a method and apparatus, which is capable of carrying out the method, whereby the oil supplied to bearings, particularly those operating under high speeds and wherein high unit pressures prevail, may be maintained relatively cool.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:—

1. A lubricated bearing adapted, in operation, to form a tapered film, means for supplying oil to the bearing where the tapered film starts to form, and means to deflect oil from the bearing after it has passed through the tapered-film stage.

2. A bearing comprising a plurality of cooperating members which, when lubricated and in operation, form a load-sustaining tapered oil film, an inlet supplying oil where the tapered film starts to form, an oil outlet, and baffle means to deflect oil into the outlet after it has passed through the tapered-film stage.

3. A lubricated bearing comprising a plurality of bearing members which, in operation, cause the formation of a load-sustaining wedge-shaped or tapering oil film, means for supplying lubricant to the place where the film starts to form, outlet means for oil which has passed through the tapered-film stage, means cooperating with the outlet means to assure the passage therethrough of the major portion of the lubricant which has passed through the tapered-film stage, whereby the heated lubricant is removed and relatively cool lubricant is supplied for the formation of the film.

4. In a thrust bearing, a thrust collar, a plurality of shoes cooperating therewith, means between the shoes for deflecting oil discharged from the leaving sides thereof, and means for supplying oil to the leading sides of the shoes.

5. In a thrust bearing, a thrust collar, a plurality of shoes cooperating therewith, means between the shoes for deflecting oil discharged from the leaving sides thereof, and means for supplying oil to the leading sides of the shoes, the leading sides having inclined surfaces to assist in supplying oil to form films.

6. In a thrust bearing, a thrust collar, a plurality of segmental shoes cooperating therewith, means for supplying oil to the leading edge of each shoe, and means to deflect oil discharged from the leaving edge of each shoe, whereby the leading edge of each shoe may be supplied with relatively cool uncontaminated oil.

7. In a thrust bearing, a thrust collar, a plurality of segmental shoes cooperating therewith, an oil supply communicating with the inner ends of the shoes, means for blocking the spaces between the shoes, and means affording communication between the leading edge of each shoe and said supply.

8. In a thrust bearing, a thrust collar, a plurality of segmental shoes cooperating therewith, an oil supply communicating with the inner ends of the shoes, means for blocking the spaces between the shoes, the leading edge of each shoe being inclined in the direction of lead, and means affording communication between the leading edge of each shoe and said supply.

9. In a thrust bearing, a thrust collar, a plurality of segmental shoes cooperating therewith, an oil supply communicating with the inner ends of the shoes, means for blocking the passages between the shoes, baffles between the shoes to deflect oil discharged from the leaving edges thereof, and means affording communication between said supply and the leading edges of the shoes.

10. In a thrust bearing, a thrust collar, a plurality of tiltably mounted shoes cooperating with the collar, means to supply lubricant to the leading edge of each shoe, and means cooperating with the collar to deflect lubricant passing from the leaving edge of each shoe to prevent contamination with the leading edge supply.

11. In a thrust bearing, a thrust collar, a plurality of tiltably mounted shoes spaced apart, a baffle carried by the leading edge of each shoe to deflect lubricant discharged from the leaving edge of the preceding shoe, and means to supply lubricant to the leading edges of the shoes and in the rear of the baffles.

12. In a thrust bearing, a thrust collar, a plurality of tiltably mounted segmental shoes with radial spaces therebetween, a radial baffle carried by the leading edge of each shoe to deflect lubricant escaping from the leaving edge of a preceding shoe, and means to supply lubricant to the leading edges of the shoes in the rear of the baffles.

13. In a thrust bearing, a thrust collar, a plurality of spaced-apart, tiltably-mounted shoes cooperating with the collar, baffle means cooperating with the leading edge of each shoe to deflect lubricant escaping from the leaving edge of the preceding shoe, means for blocking the spaces between the shoes, and means carried by the leading edge of each shoe for supplying lubricant thereto in the rear of the baffle.

14. A shoe for a thrust bearing having a baffle followed by an oil supply chamber at the leading side of the shoe.

15. A shoe for a thrust bearing having a baffle followed by an oil supply chamber at the leading side thereof and an oil-escape port for the chamber.

16. A segmental shoe for a thrust bearing having a radial baffle followed by a radial oil supply chamber which in turn is followed by an inclined surface at the leading side of the shoe.

17. In a thrust bearing, a thrust collar, a plurality of segmental shoes cooperating therewith, an oil supply communicating with the inner ends of the shoes, baffles carried by the shoes to block the radial spaces therebetween, a radial chamber followed by an inclined surface at the leading side of each shoe, an escape port in the outer end of each chamber to assure sufficient circulation to keep the oil cool, and a baffle constituting the forward wall of each chamber to deflect oil passing from the leaving side of a preceding shoe.

18. A process of lubrication which consists in injecting oil into a bearing for the progressive formation of a tapering film and in removing the oil immediately after it has passed through the thin-portion film stage to prevent commingling thereof with the injected oil.

19. A process of circulating oil through a bearing which consists in feeding oil to a suitable portion of the bearing for the formation of a load-sustaining, tapering oil film and in immediately removing the oil after it has constituted a film of diminishing thickness to prevent commingling thereof with the oil being fed, whereby the oil for the bearing is prevented from overheating.

In testimony whereof, I have hereunto subscribed my name this second day of August, 1921.

JOSIAH F. JOHNSON.